(12) United States Patent
Khoo

(10) Patent No.: US 9,542,696 B2
(45) Date of Patent: Jan. 10, 2017

(54) SYSTEMS AND METHODS FOR ONLINE DIRECT MARKETING AND ADVERTISING ON REGISTRATION BASED WEBSITES AND WEB-BASED EMAIL SYSTEMS

(71) Applicant: Advenix, Corp., Milpitas, CA (US)

(72) Inventor: Justin Khoo, San Francisco, CA (US)

( * ) Notice: Subject to any disclaimer, the term of this patent is extended or adjusted under 35 U.S.C. 154(b) by 0 days.

(21) Appl. No.: 14/734,865

(22) Filed: Jun. 9, 2015

(65) Prior Publication Data
US 2015/0278856 A1    Oct. 1, 2015

Related U.S. Application Data

(63) Continuation of application No. 11/581,980, filed on Oct. 17, 2006, now Pat. No. 9,076,147, which is a continuation-in-part of application No. 10/667,103, filed on Sep. 17, 2003, now abandoned.

(60) Provisional application No. 60/411,835, filed on Sep. 18, 2002, provisional application No. 60/422,293, filed on Oct. 30, 2002, provisional application No. 60/457,407, filed on Mar. 25, 2003, provisional application No. 60/478,212, filed on Jun. 12, 2003, provisional application No. 60/480,076, filed on Jun. 20, 2003.

(51) Int. Cl.
G06Q 30/02 (2012.01)
H04L 12/58 (2006.01)
G06Q 10/10 (2012.01)
H04L 29/08 (2006.01)

(52) U.S. Cl.
CPC ........ *G06Q 30/0269* (2013.01); *G06Q 10/107* (2013.01); *G06Q 30/02* (2013.01); *G06Q 30/0251* (2013.01); *G06Q 30/0277* (2013.01); *H04L 12/58* (2013.01); *H04L 51/02* (2013.01); *H04L 51/04* (2013.01); *H04L 51/046* (2013.01); *H04L 51/22* (2013.01); *H04L 67/10* (2013.01); *H04L 12/581* (2013.01)

(58) Field of Classification Search
CPC .................................................. G06Q 10/107
See application file for complete search history.

(56) References Cited

U.S. PATENT DOCUMENTS

| | | | | |
|---|---|---|---|---|
| 5,307,086 A | * | 4/1994 | Griffin | G06Q 10/109 345/636 |
| 2001/0005855 A1 | * | 6/2001 | Shaw | G06Q 10/107 709/206 |
| 2002/0004825 A1 | * | 1/2002 | Lindberg | H04L 29/06 709/218 |

* cited by examiner

*Primary Examiner* — Luat Phung
(74) *Attorney, Agent, or Firm* — James M. Smedley LLC; James Michael Smedley, Esq.

(57) ABSTRACT

An online direct marketing and advertising system is presented in which advertisers have an opportunity to send targeted promotions, coupons and offers that are placed in a user's web-based email account without the drawbacks of sending conventional email. The promotions do not take up disk quota space and, at the same time, the system does not need to divulge private user information to the advertiser. This system provides a means to free web-based email providers from the need to obtain opt-in permission to send offers to their users as providers are frequently prohibited from sharing the user's email address and personal information with merchants.

24 Claims, 15 Drawing Sheets

PROMOTER SOFTWARE ROUTINE

CONSUMER SOFTWARE ROUTINE

SYSTEMS AND METHODS FOR ONLINE DIRECT MARKETING AND ADVERTISING ON REGISTRATION BASED WEBSITES AND WEB-BASED EMAIL SYSTEMS

RELATED APPLICATIONS

This Application is a continuation of and claims priority from U.S. patent application Ser. No. 11/581,980, entitled "Systems and methods for online marketing and advertising on email systems" filed Oct. 17, 2006, which in turn claims priority to U.S. patent application Ser. No. 10/667,103, entitled "Email method and system" filed on Sep. 17, 2003, U.S. Provisional Application Ser. No. 60/411,835, entitled "Systems and Methods for Online Direct Marketing on Web-Based Email Systems and Websites Over a Network," filed on Sep. 18, 2002, U.S. Provisional Application Ser. No. 60/422,293, entitled "Systems and Methods for Online Direct Marketing and Advertising on Email Systems Over a Network," filed on Oct. 30, 2002, U.S. Provisional Application Ser. No. 60/457,407, entitled "Systems and Methods for Online Marketing and Advertising on Email Systems Over a Network," filed on Mar. 25, 2003, U.S. Provisional Application Ser. No. 60/478,212, entitled "Systems and Methods for the Enhancement of Email Client User Interfaces and Email Message Formats," filed on Jun. 12, 2003, and U.S. Provisional Application Ser. No. 60/480,076, entitled "Systems and Methods for Online Direct Marketing and Advertising on Registration Based Websites and Web-Based Email Systems," filed on Jun. 20, 2003, each of which is incorporated by reference herein in its entirety.

FIELD OF THE INVENTION

An online direct marketing and advertising system is presented in which advertisers have an opportunity to send targeted promotions, coupons and offers that are placed in a user's web-based email account without the drawbacks of sending conventional email. The advertiser transmits promotion content and targeting information to the system wherein the promotions will be placed in a separate folder or a special "offer box" within user's web-based mail account. The promotions do not take up disk quota space and, at the same time, the system does not need to divulge private user information to the advertiser. This invention also includes a dynamic graphical previewing system to allow recipients to easily preview promotional offers.

This system provides a means to free web-based email providers from the need to obtain opt-in permission to send offers to their users as providers are frequently prohibited from sharing the user's email address and personal information with merchants. Also this system helps aggregate promotions for smaller web-based email providers and ISPs who are not big enough individually to attract large promoters to send direct marketing offers to their system.

This system can either reside within a web-based email provider's system or be delivered over a network to multiple web-based email providers. The invention also applies to sending offers to consumers through other kinds of registration based web sites as well, such as portals.

BACKGROUND OF THE INVENTION

Direct mail and coupons is a huge business. It is not only effective but also receivers of these promotions find value in it. It allows merchants a chance to reach new customers and consumer-packaged goods manufacturers to introduce or promote products to a wide audience. The receivers have a chance to save money and an incentive to try out new products.

The Internet looks poised to bring a whole new level of effectiveness and personalization to direct mail and coupons. Until now the methods introduced on the Internet include direct offers via email and coupon portals. Unfortunately both these methods have proven ineffective.

Email has proven to be an inadequate medium for online promotions because of its inherent "free" nature. In the offline world of postal direct mail, it costs promoters to send offers to households. The promoter has to pay for printing and mailing costs which would range anywhere from 40 cents to a few dollars for each household mailed, therefore, even if the promoter could obtain the address of every household in the US it would not be cost effective to send them to every single household. But, because sending emails is free, promoters have no barrier to send an email to every email address they can get their hands on—leading to the practice of sending massive amounts of untargeted unsolicited email—Spam. Not every promoter participates in spamming, but because of the rampant practice of Spam, users have become numb to offers received through email—whether they be targeted or not—thus crippling a potentially effective channel for direct marketing and promotions.

Coupon portals such as MyCoupons.com, Valpak.com and Coolsavings.com have been set up to serve coupons of merchants and consumer goods manufacturers to Internet users. Unfortunately, most users do not actively search for coupons and offers; they merely take up the offer when it is presented to them, either through coupons received in the mail or in the Sunday newspapers. The majority of the users who frequent coupon portals are "coupon fans" and penny pinchers, not necessarily the kind of demographic the promoters are looking for.

Web-based email providers like Hotmail and Yahoo have also set up their own direct-email services where users opt-in to receive offers from merchants who sign up with the providers to send targeted offers to users of these web-based email providers. One such service is Hotmail's MSN Featured Offers. The drawback is that recipients need to opt-in to receive these promotions and the promotions still clutter the user's inbox and they do not expire. One of the further drawback is that these promotions suffer the drawback of email, where the user is forced to open the promotion to see its contents as the subject line of the promotion such as "HP Printer 5500C for $100" often does not provide enough information for the user (What is the HP 5500C? What does it look like?).

One method used by promotions provider Greenmail.com is where promotional graphics are shown instead of text in the listing of promotional offers. This method suffers from a cluttering of the screen as static graphics take up a large portion of the browser screen space as opposed to text (Greenmail.com is not an email site).

Aside from the major web-based email providers like Hotmail and Yahoo, there are many smaller Internet Service Providers (ISP) who provide web-based email service to their customers. Since these ISPs are focused mainly on the operations of their network, they do not have the resources to set up their own direct marketing organization and would benefit from being part of an affiliate system that would supply the technology and direct marketing content to them.

SUMMARY OF THE INVENTION

It is an object of the present invention to provide online marketing and advertising systems and associated methods to deliver targeted promotions to web-based email users, email users and other registration based web-site visitors that are associated with predetermined marketing profiles. These profiles allow the web-based email providers to allow marketers to target the recipients while preserving the personal information of each recipient and protecting their users from potential spam.

Here on after, the document will mainly refer to web-based email systems and providers—however the invention may apply equally to all other kinds of registration based web-sites.

The present invention may be hosted on a web-based email provider's system or be hosted by a 3rd party and the promotions be delivered over a network to multiple web-based email systems.

It is a further object of the present invention to provide marketing systems and associated methods to deliver targeted promotions to web-based email users within the web-based interface but without taking up the user's email disk quota space, with the ability to manage these promotions from a server separate from the server that manages the user's email content.

It is still a further object of the present invention to provide marketing systems and associated methods to deliver promotions to web-based email users in a specialized folder within the web-based email interface or in a special promotion only section (Offer Box) within the inbox of the web-based email interface. The promotions may have expiry dates, when the promotion will be automatically deleted from the system.

It is still a further object of the present invention where special search related offers are placed in the above mentioned folders or Offer Box, wherein the offers are based on the user's prior web search queries.

It is still a further object of the present invention to provide marketing systems and associated methods to allow a method to preview a promotion directly from an aggregate listing of promotions, or a mixed listing of promotions and email without opening the message itself, allowing the promoter to put creative mechanisms such as graphics, animation or multi-media in the preview to entice the user to open the promotion itself. The preview routine further helps the user by giving the user a better idea of the content of the promotion than by guessing from the subject line of the promotion.

It is still a further object of the present invention to provide marketing systems and associated methods to users of the web-based email service to select promotions and coupons online and send them to be printed by a separate system and mailed through the postal service to the user to be redeemed at a store. The systems and method of the present invention therefore enables promotion recipients who do not have access to a printer to take advantage of these promotions as well as provide coupon issuers who do not want their coupons to be duplicated a means to participate in online promotional methods.

In a preferred embodiment, web-based email providers collect information about users and this information is categorized and created into profiles. These profiles and not the actual customer information is transferred to a central system that provides the promotions for a network of web-based email providers.

In a preferred embodiment the invention is realized over a networked computer environment, where in promoters create promotions and specify the target profiles of their intended recipients, wherein the system will automatically place the promotions into specialized promotion folders in the web-based email providers' users' accounts. Users who log into their account will be able to click to the promotion folder(s) and preview or purview the promotions.

In a preferred embodiment, the listings of the promotions will each include a triggering routine that will trigger the showing of a preview—either an image or graphic, an HTML layer overlay or a Macromedia Flash overlay graphic or any other routines obvious to those skilled in the art. The triggering routine in the preferred embodiment will be an icon.

In a preferred embodiment, the invention is realized over a networked computer environment, wherein a promotions server resides as a node on the network. The various promotions are stored on the network of the server and preferably on the server. When, for example, a user using a browser accesses the web page that is affiliated with the promotions server process, which contains the listings of the promotions, the affiliated page's encoding includes content served by the promotions server process. The affiliate web-based email provider's web server would also contain a client process that will send encoded profile information to the promotions server to enable the server to serve the correct promotions to the user.

The user will be able to view a listing of promotions when logged in to his web-based email account. Upon moving the mouse on an offer listing or a triggering icon, a JavaScript or VBscript code is executed on his browser that will make a small overlay window appear showing a preview of the content of the promotion. Upon clicking on a link on the listing, the browser will then send a request to the affiliate web-server process, which in turn forwards the request to the promotions server to load the content of the promotion.

In a preferred embodiment, the previews of the promotions will be loaded only after the visible content of the listings are loaded to enable the page to look as if it has completed loading earlier. The previews of the promotion, which may contain graphics and other audio or visual elements, will load in the background while the user is viewing the listing. This can be achieved using script code such as JavaScript that is loaded into the user's browser, server code, or a combination of both.

In a preferred embodiment, the invention includes a central printing server that is connected to the promotions server over a network. The central printing server will print out promotions and coupons that will be mailed to users of affiliated web-based email providers.

According to an embodiment of the present invention, a method for placing preview enhanced messages in registration based websites comprises: a user node having a browser program coupled to a network, the user node providing requests for information on the network; a promotions server node in operative association with a data repository responsive to a request and deliver promotions to the user node.

According to an embodiment of the present invention, the promotions server node contains profile information about the user and is able to send targeted promotions to the user.

According to an embodiment of the present invention, the promotion listing contains a mechanism to dynamically display and hide graphical elements that serve as a teaser to the promotions on top of the aggregate listing of promotions.

According to an embodiment of the present invention, the mechanism is an icon.

According to an embodiment of the present invention, the promotion listing is in a separate folder than the listing of the user's email (ie. inbox).

According to an embodiment of the present invention, the promotion listing is in the same page as the listing of the user's email (ie. inbox).

According to an embodiment of the present invention, a method for placing search query based offers in the main page of registration based websites comprises: a site to which promotions may be displayed to users visiting the site; a search database with keywords keyed to certain sites an mechanism to allow the user to enter a search query; a persistence datastore to hold and remember the user's search query; a mechanism to display a plurality of results of the search query to the user at another point in time.

According to an embodiment of the present invention, the search database contains paid listing in which results will allow the reader to be sent to the promoter's web-page or promotion content.

According to an embodiment of the present invention, the registration based website is a web-based email provider and the results appear within the page displaying the user's email listing.

According to an embodiment of the present invention, the search result listing contains a mechanism to dynamically display and hide graphical elements that serve as a teaser to the promotions on top of the aggregate listing of search results.

According to an embodiment of the present invention, the mechanism is an icon.

According to an embodiment of the present invention, the search result listing contains a mechanism to dynamically display and hide graphical elements that serve as a teaser to the promotions on top of the aggregate listing of search results.

According to an embodiment of the present invention, the mechanism is an icon.

According to an embodiment of the present invention, a system of delivering promotions to web-based email users comprises: a server running a web-based email system; a data repository at the web-based email provider maintaining a database of user demographics information; a process running on the web-based email provider's system interacting with; a promotions server on the network containing; a data repository containing promotions targeted towards one or more selections of demographics stored in the data repository at the web-based email provider.

According to an embodiment of the present invention, the promotions are displayed in a separate page than the web-based email provider's emails. The promotions are displayed in a virtual folder that is separate from the user's emails.

According to an embodiment of the present invention, the promotions are stored separately from the user's email and does not take up space in the user's disk quota.

According to an embodiment of the present invention, the promotions are sent as email to the user's account.

According to an embodiment of the present invention, the listing of the promotions approximate the look of email listing with attributes including name of promoter or from, offer or subject, date, expiry, distance from the user's geographic location and category or type of promotion.

According to an embodiment of the present invention, the listing of the promotions are sortable according to the attributes such as name, date, expiry date and distance.

According to an embodiment of the present invention, the system allows the promoters the ability to perform splits on promotions—the ability to simultaneously send different promotions or different versions of the same promotion, to a specific population of users and having the users receive no more than one copy or version of the promotion. The system will provide promoters the ability to compare the effectiveness of the different promotions to each other.

According to an embodiment of the present invention, the system further comprises a software module to allow the recipient to rate the promotion in terms of interest, value or preference and an associated data storage to store the rating information.

According to an embodiment of the present invention, the system further comprises a software module to enable the recipient of the promotion to save, sort and categorize offers by a predetermined classification, and to request the promotion to be printed and mailed to his address.

According to an embodiment of the present invention, promotions are automatically deleted from the promotion folder when the expiry date of the promotion is reached.

According to an embodiment of the present invention, the system further comprises a software module to allow promotions to be searched by the text content of the promotions, name of promoter, category and geographic location of the store.

According to an embodiment of the present invention, a method for displaying a preview of a message on a web page which consists of: message content stored in a data repository; a listing of a plurality of messages on a web-page; preview content for the plurality of messages that can be visually visible overlaying a portion of the visible portion of a web-page; a triggering mechanism which will trigger the appearance of the preview content;

According to an embodiment of the present invention, the message listing comprises promotions shown in a web-based email provider's user interface According to an embodiment of the present invention, the message listing comprises emails shown in a web-based email provider's user interface.

According to an embodiment of the present invention, the preview is a hidden HTML layer containing graphics, HTML content, audio, Macromedia Flash content or Java applet According to an embodiment of the present invention, the triggering mechanism consists of an image icon and associated script on the web-browser that will trigger the appearance of the preview content when the user hovers the mouse over it.

According to an embodiment of the present invention, the triggering mechanism is a script executing on a web-browser that detects the mouse positioned over certain elements of a particular list element and triggering the appearance of the preview content for the element.

According to an embodiment of the present invention, the method further comprises a mechanism used to delay the load of the hidden preview content until the visible preview contents are loaded.

According to an embodiment of the present invention, the method further comprises a mechanism used to delay the load of the hidden preview content until the user activates the trigger for the preview.

According to an embodiment of the present invention, the visible preview will be deactivated or become hidden when the user moves the mouse of the triggering element, or after a predetermined time has elapsed.

According to an embodiment of the present invention, the loading of the preview content uses a predictive algorithm to determine the order in which the content should be loaded. The algorithm may take into account, the priority given to the promotion, the size of the preview content, real-time triggering order of the previews by the user which may include the proximity of the non-yet-loaded previews from previously viewed and loaded previews.

According to an embodiment of the present invention, a preview content that is triggered is not made visible until the specific preview content being triggered has completed loading. While the preview content is loading, an animation or alternative graphic is shown to the user.

DETAILED DESCRIPTION

Figure 1:
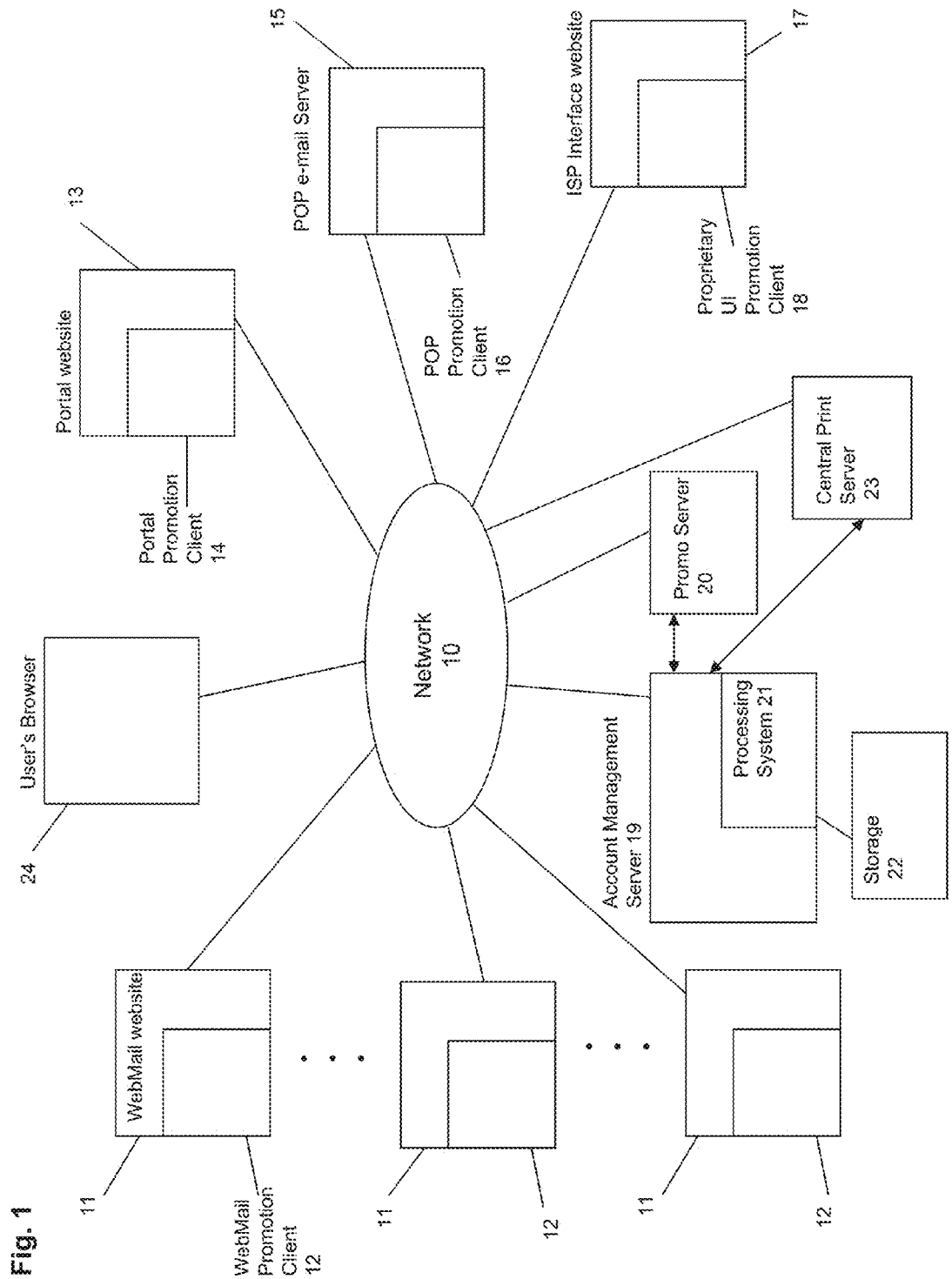
FIG. 1. is a block diagram illustrating the relationship between a large networks and one embodiment of the system and method for direct marketing over a network of the present invention.

In FIG. 1, The basic architecture of the network 10 comprises a plurality of affiliate web-based email (WebMail) sites 11, the user's browser 24, a promotions (promo) server web site 20, and its supporting account management system 19, storage 22, and a optionally a plurality of print servers 23. The architecture may include one or more affiliate Portal websites 13 which may be a news portal, financial portal or any other content or e-commerce based website familiar with one skilled in the art, one or more affiliate POP email provider's systems 15, and one or more affiliate ISP custom user interface sites 17. An example of an ISP custom user interface site is the AOL user interface which users have to launch in order to get online.

Each affiliate system will include a client process 12, 14, 16, 18 that is responsible for the integration and communication between the affiliate server processes 11, 13, 15, 17 and the promotion server 23.

The discussion of the invention will now focus on the web-based email affiliate systems 11, although it equally applies to the other affiliate systems 13, 15, and 17.

Overview

Figure 7:
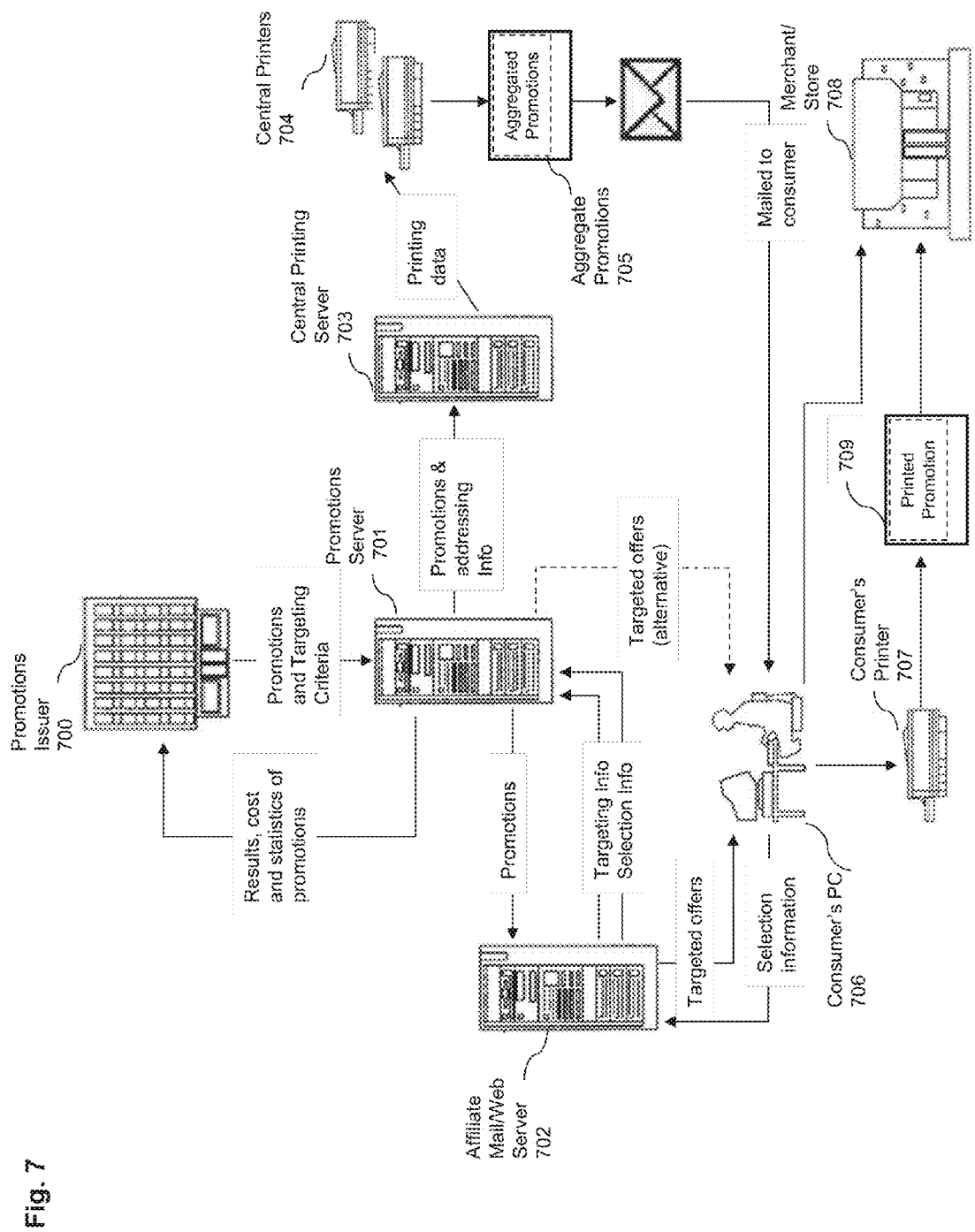
FIG. 7. depicts the flow of information in a system delivering online promotions to consumers according to the preferred embodiment.

FIG. 7 is an overview showing how the information and activities flow from the creation of the online promotion to its selection and printing by the consumer or central printing system and its ultimate redemption.

The process starts with the promotions issuer 700 who creates the promotion (which may include coupons and certificates) and accompanying recipient targeting instructions and uploads them to the promotions server 701 which receives the instructions and content which are stored in storage. The web-based email user, through his PC 706, logs in to the affiliate web-based email server 702, to check for email and at the same time decides to check for promotions. The promotions client on the affiliate web-based email server 702, sends information about the user (but not personally identifiable information like email or name) such as zip, age, online behavior profile, and personal preferences to the promotions server 701 to retrieve the targeted promotions. The data sent may include a generated ID of the user. This ID may be used to track a user's promotions redeeming behavior—however, the ID does not reveal the user's name or email address. The promotions server 701 serves up the promotions and logs the event in its records for billing and reports purposes.

The promotions then get served to the user's PC 706, wherein the user may save or print the promotion through an attached printer 707. Alternatively, if a user has signed up for an enhanced service for coupons to be printed and mailed to the user, the promotions information will be passed from the promotions server 701, to a central printing server 703 where the user's selected promotions and any additional relevant promotions may be included or printed through the attached printers 704 and mailed to the user. The kinds of additional promotions included in the package mailed to the user may depend on the user's past redeeming information if available, which is stored on the promotions server 701. These additional promotions may include printed coupons not available electronically. In order to mail the promotions to the user, the user would have to agree to share his address and any personally identifiable information with the promotions service provider, which is sent with the promotion printing instructions from the promotions server 701 to the central printing server 703.

The electronically saved and printed promotions may contain the expiration date, a unique serial number and a barcode with the personal identification number (PIN) of the consumer. This identification data is preferably assigned by the promotions server 701, the PIN number can be pre-assigned to individual consumers when they register for the system.

Anytime before a promotion expiration date, the consumer may use one of two methods to redeem it. Firstly, the user may bring the printed promotions or coupon 705, 709 to the store to 708 to redeem the promotion. Secondly, in the case of a promotion for an online offer, the user may redeem the electronic promotion by transmitting the electronically saved promotion coupon through the network to the merchant's web site. In other forms of promotions, the user may simply use the unique serial number of the promotion or coupon to redeem the offer.

When the expiry date of a promotion is reached, the promotion will be automatically removed from the system.

Information can also be passed back up through the system, first to the promotions server 701, from the web-based email web-server 702 and then on to the promotions issuer 700. Thus the promotions issuer can download information about the promotion results, consumer demographic information and cost.

Figure 5:
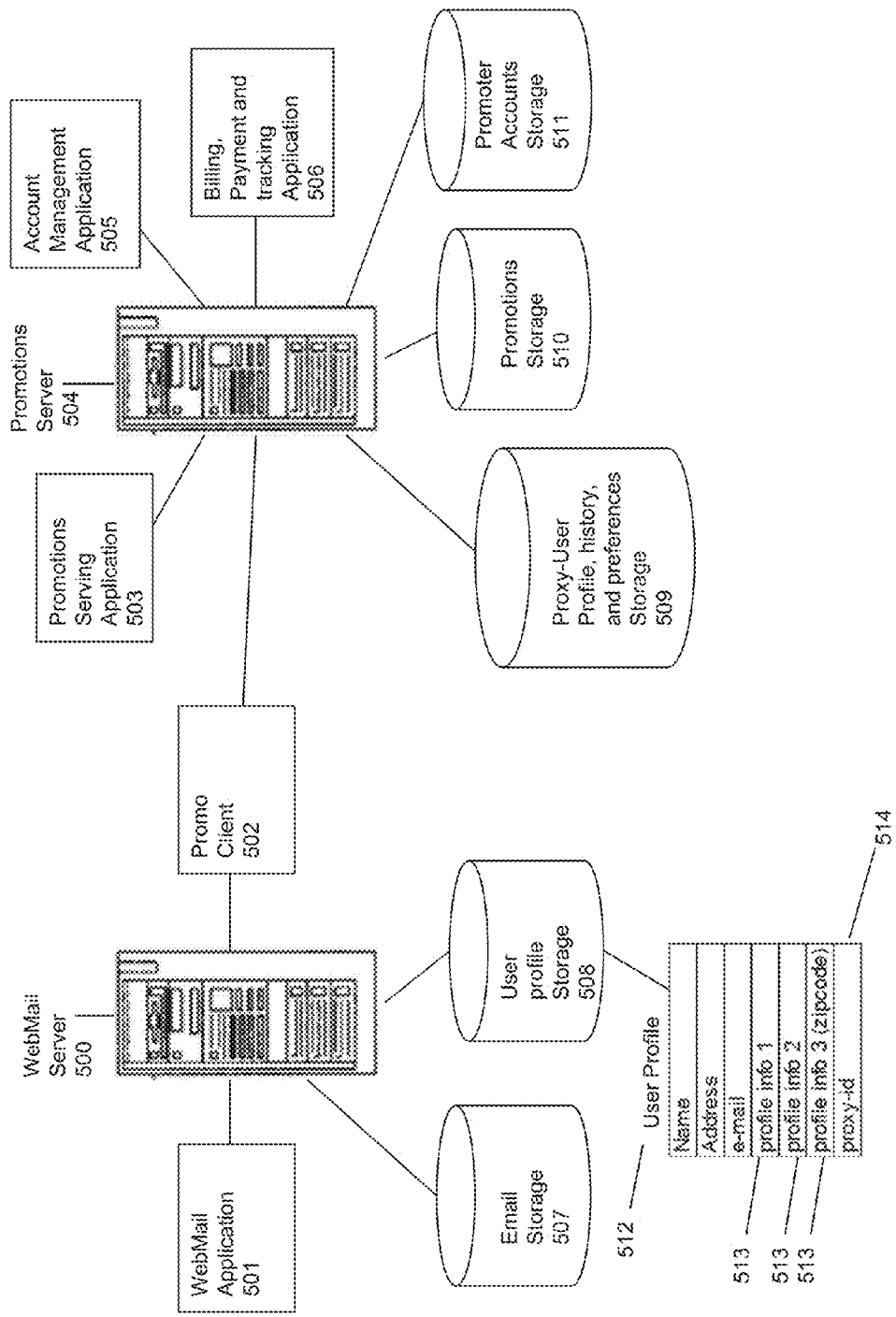
FIG. 5. is a diagram explaining the processes performed in the preferred embodiments.

FIG. 5 shows the various components of the said invention in the preferred embodiment. It includes the affiliate web-based email provider's application 501, email storage 507 and user profile storage 508 resident on the web-based email provider's server 500. The promotions system includes the promotions client (promo) 502, promotions serving application 503, promotions account management application 505, billing and tracking applications 506, promotions storage 510, promoter accounts storage 511, and the proxy-user profile storage 509—all resident on the promotions server 504.

User information is aggregated by the affiliate web-based email provider into distinct profiles 513, which are stored in the provider's local storage 508 in a user profile table 512. The table contains user identifiable personal information such as name, address and email, but only the profile information 513 is available to the promotions client 502, in order to retrieve targeted promotions for a particular user on the web-based email system. In this case, a unique proxy ID 514 may also be generated by the web-based email application 501 which may be shared with the promotions client and is passed to the promotions server to create more targeted promotions based on usage patterns and preferences, as well as the ability for the user to save promotions. This information is stored in the proxy-user profile, history and preferences storage 509.

Web-based email users may subscribe to a premium service where the user can designate promotions and coupons to be printed and mailed to the user by a separate system. When users opt for this service, the proxy-user storage 509 also stores the user's email address, home address as well as other personally identifiable information.

User Software Routine

Figure 9:
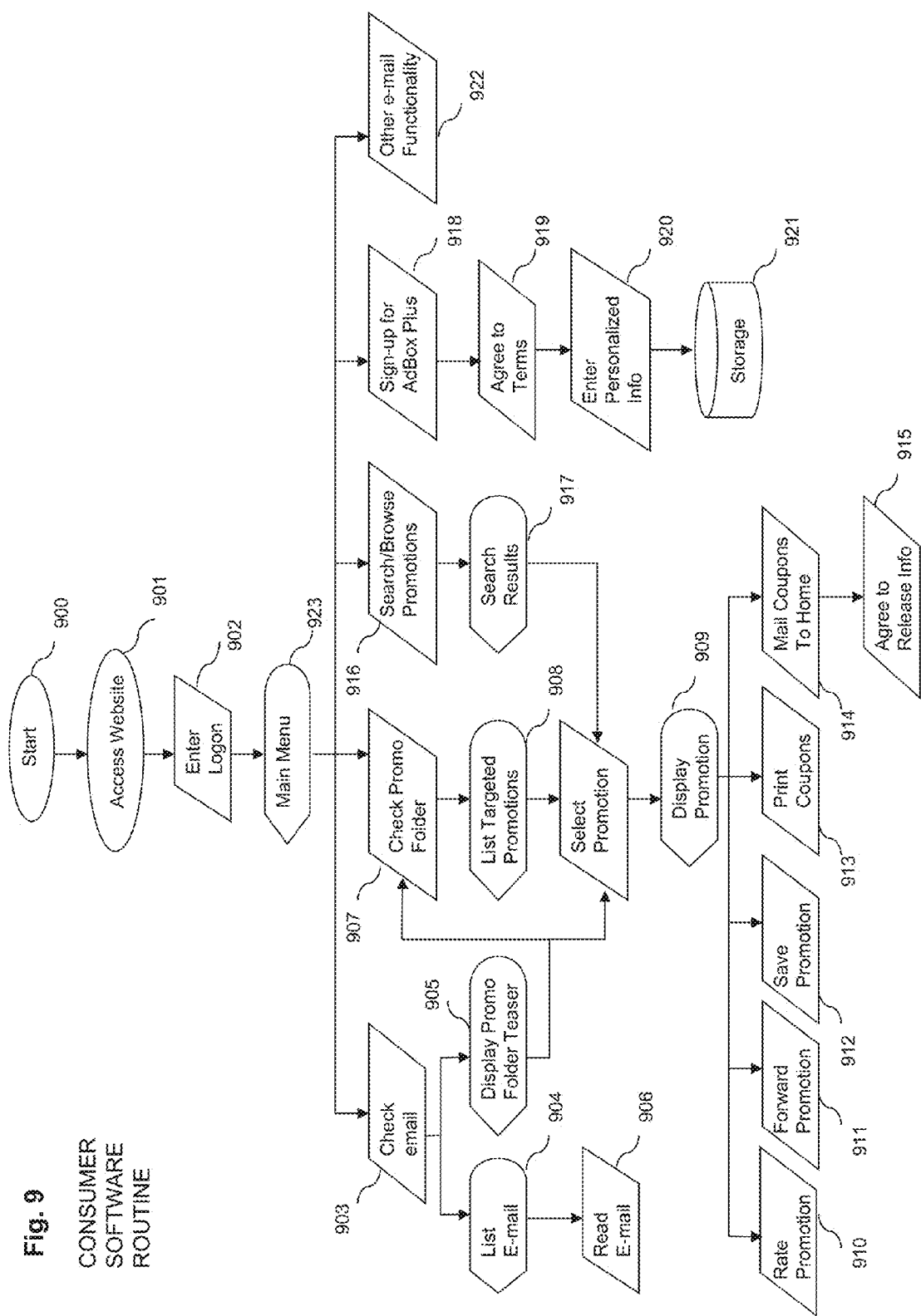
FIG. 9. is a flowchart of a software routine for a web-based email user according to the preferred embodiment.

FIG. 9 displays the software routine for the consumer—in this embodiment the web-based email user. It starts 900 with a display of the web-based email provider's public home page 901. The user logs in 902 and is presented with the main menu 923. The user may check his email 903 upon which both a list of email 904 and a subset of promotions in his promotions folder 905 are displayed. The promotions may appear as a separate listing or integrated into the email listing itself 904. The user may then choose to read his email 906 or to click on a link to check the promotions in his promotions folder 907. The user may also opt to select a promotion directly from the inbox 904.

The user activates the promotion folder 907 by clicking a link from the main menu 923 or from his inbox 904. The web-based email provider's application will interact with the promotions client, which interacts with the promotions server to display a list of promotions and their associated previews 908. The user may select to view a promotion 909. While viewing the list of promotions 908 or viewing a particular promotion 909, the user may rate the promotion 910 to show his interest in the promotion or promotion type, forward the promotion to an email address 911, save the promotion 912 to view or print at a later time, print the promotions or coupons 913 on a printer attached to his computer, or to select an option for the promotion or coupon to be printed and mailed 914 to his address. In certain cases, where the coupons are to be mailed directly from the promoter or merchant, the user will be prompted to release their personal identifiable information 915 such as home address to the promoter.

From the main menu 923 the user may also search or browse for promotions 916 according to categories such as Automotive, Restaurants, Consumer Goods, Grocery, Services and Online Stores. The user may enter search criteria to locate merchants or promoters by name or location within a certain geographic zone. When the user executes the search or browses, the promotions client will send the queries to the promotions server wherein the results of the queries will be displayed 917 in the user's browser.

To access more personalized promotions users may sign-up for a premium version of the promotions service (AdBox Plus) 918, wherein the user will be prompted to agree to service terms 919 and then the user is prompted to enter personal identifiable information 920 such as name, address, zip, age, promotions preferences and email. The promotions server will log the user's personal information and service agreements in a database storage 921. The enhanced personal information provided will allow the promotions system to send more targeted promotions to the user using techniques such as data mining. The promotions server may also combine this enhanced user information stored in the service storage 921 with other techniques such as user ratings of promotions 910, to offer a more personalized experience for the user and provide a promoters with a more highly effective channel to promote their services or products.

The user may also choose to perform other email functions 922 commonly offered within most web-based email services, such as address book, email filtering and email blocking.

Offer Box in the Inbox

Figure 4A:
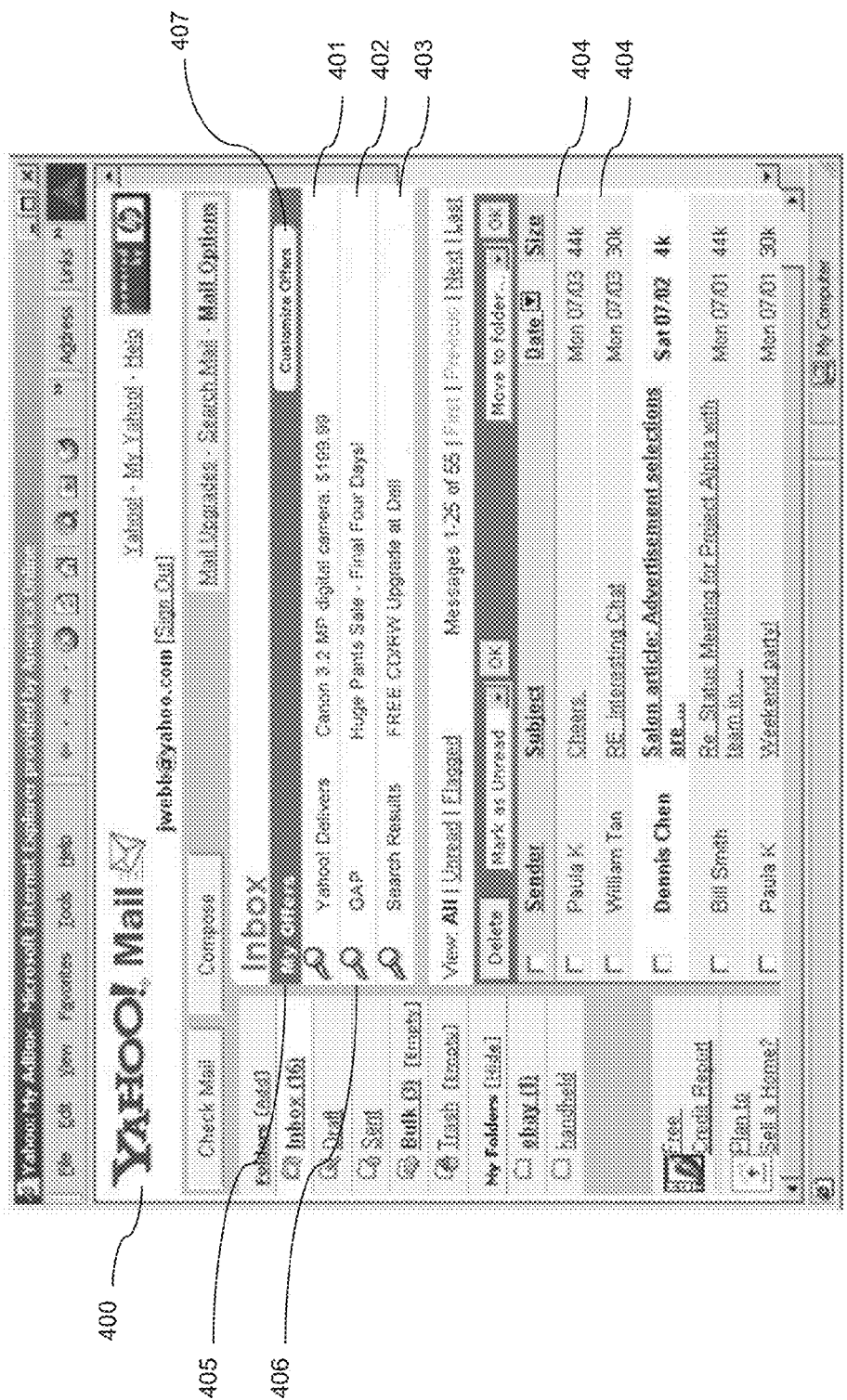
FIG. 4a. illustrates an example wherein promotions are placed within the same page as the listing of a subscriber's email in one embodiment of the present invention. The promotions includes a plurality of promotion types, such as direct marketing offers, email offers and search query offers.

FIG. 4a shows another embodiment of the invention where promotional offers 405 are placed within the same page as the Inbox listing the subscriber's email 404. This invention allows the ability to send offers to recipients based on their profile without cluttering the inbox with email offers. As the promotions in the "Offer Box" are rotated, the subscribers email space is not filled up. The Web-based email providers can now allow marketers to send Email Offers, Coupon Offers and other promotions to their recipients without the recipient having to pre-"opt-in" to receive offers in their email inbox as these promotions are not technically emails. Opening these offers may open the content of the offer or direct the recipients to a "landing page" of the website of the promoter.

The Offer Box includes a plurality of offer types, such as Offers sent directly from the web-based email provider's advertising business 401, Offers from outside marketers 402, and offers based on the subscriber's previous search queries or preferences 403.

The subscriber may modify and customize the types of offers received by clicking on a link 407 to a customize offers page.

These Offers may or may not have the dynamic preview capability attached to them depending on whether the marketer chooses to add the additional graphic or text for the preview. Offers and promotions with preview will appear with an icon 406.

Figure 4B:
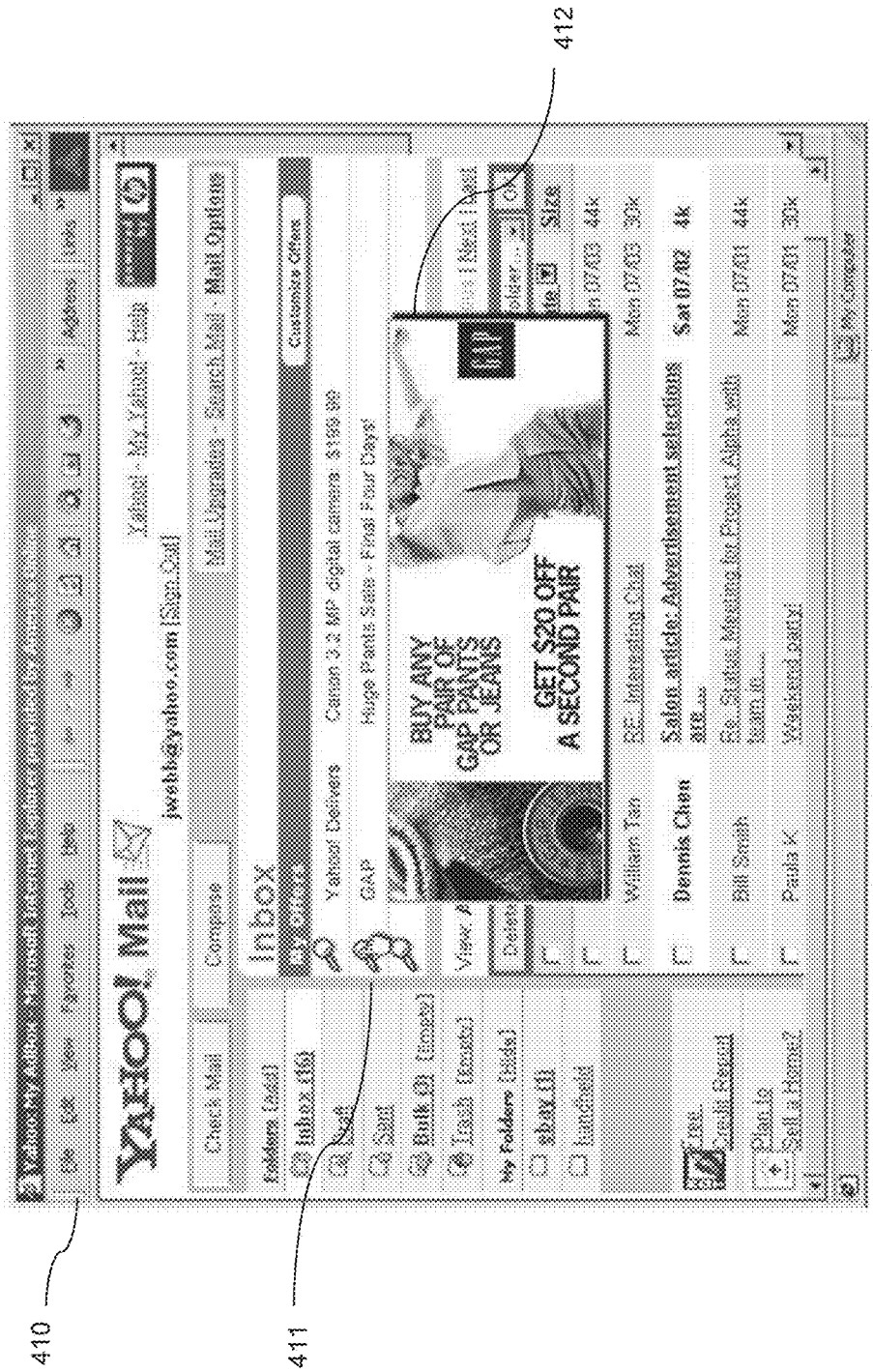
FIG. 4b. illustrates an example of a preview of a promotion triggered by the hovering of the mouse on top of a triggering icon.

FIG. 4b shows an example of an embodiment of the invention wherein the user has his mouse over the triggering icon 411 for a promotional offer and a preview or "teaser" of a promotion is displayed 412.

Figure 4C:
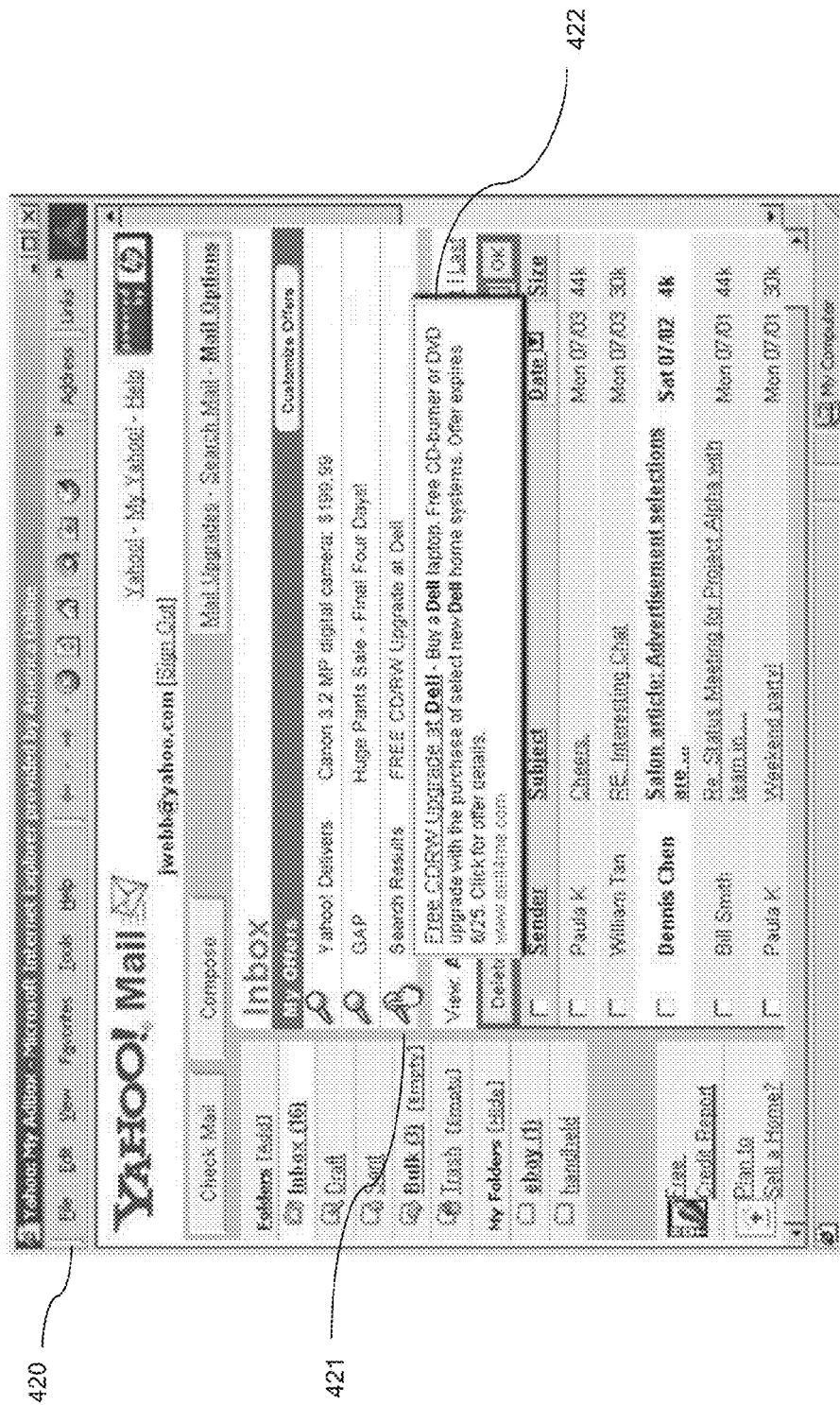
FIG. 4c. illustrates an example of a preview of a search query based offer triggered by the hovering of the mouse on top of a triggering icon.
Figure 4D:
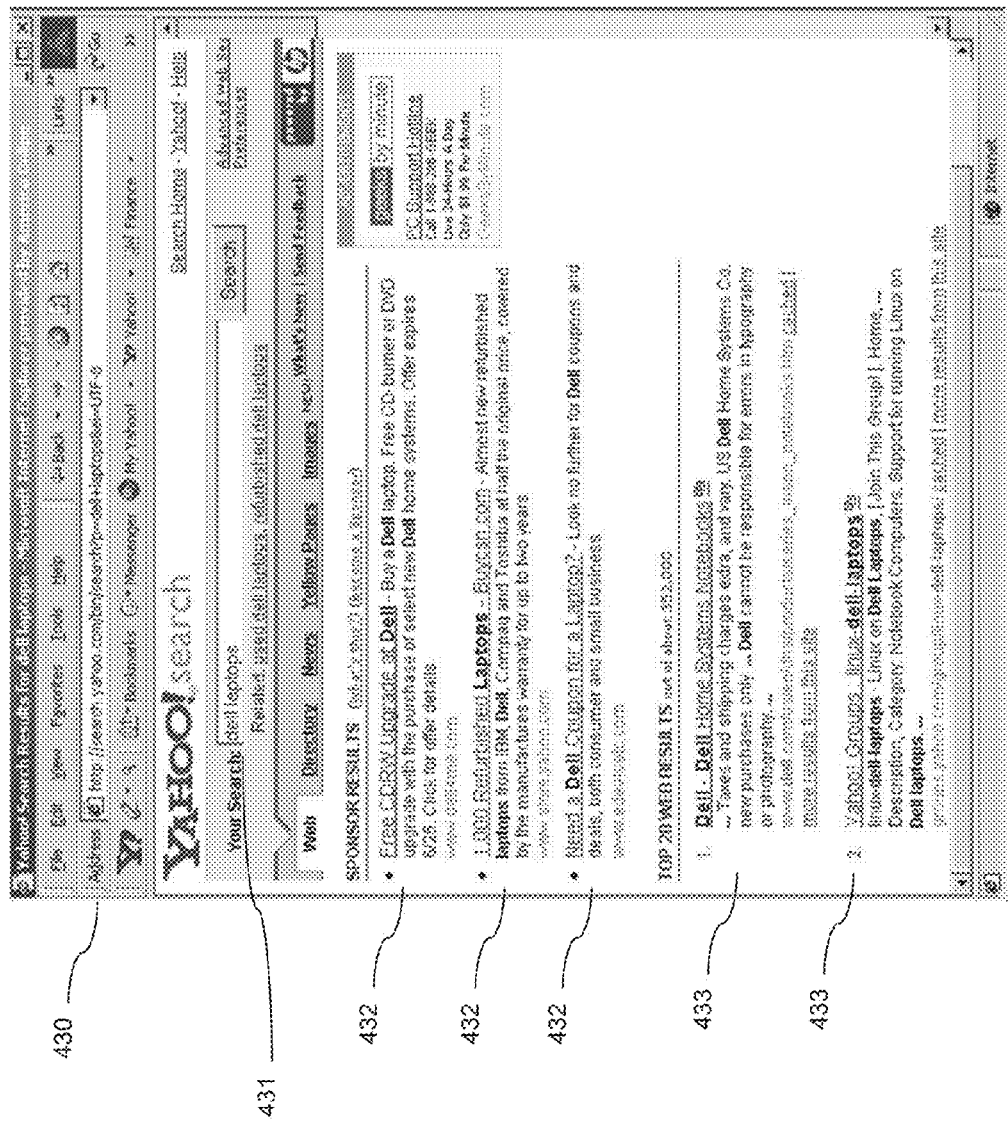
FIG. 4d. illustrates an example of a search page of sponsored and non-sponsored search results, where certain sponsored listings may be listed in the embodiment of the invention in FIG. 4c.

FIG. 4c shows an example of an embodiment of the invention wherein the user has his mouse over the triggering icon 421 for a search based offer and a preview of a text-based description of the offer is displayed 422. In another embodiment not shown, the preview may be a graphic. The search based Offer 403, is retrieved from either a local or 3$^{rd}$ party based sponsored search listing as shown in FIG. 4d. As shown in FIG. 4d. the search query 431 produces a listing of sponsored (paid) 432 as well as non-sponsored 433 search results. Based on the users past queries, sponsored search results may be placed within the Offer Box 403. The advantage of this aspect of the invention is that subscribers may only conduct a search once, but may be "in the market" for the items he searched for a brief period of time. Placing results in the Offer Box allows the subscriber to respond to new offers matching his search criteria without consistently repeating the same search requests. The search related offers in the Offer Box may be based on the recency and frequency of the user's search. Alternatively, the search related offers may be pulled from other sources other than sponsored listings, such as online retail businesses such as Amazon.com or auctions such as eBay. The present invention covers the aspect of placing search related offers in the Offer Box even without the preview capability/mechanism.

Figure 4E:
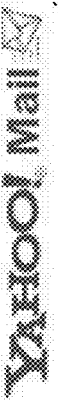
FIG. 4e. illustrates an example of a page that allows subscribers to customize the offers based they received based on a plurality of criteria such as favourite search terms, demographics, interests and geographical location.

FIG. 4e shows an example of what the subscriber sees when he clicks on the "customize offers" link 407. A plurality of criteria is used to target offers to subscribers. The criteria may include favourite search terms (or previous search terms) 441, subscriber demographic information 442, or categories of interest to the subscriber 443. This information is compiled into a subscriber profile and is matched against potential offers.

Details on the User Interface Processes

Figure 2:
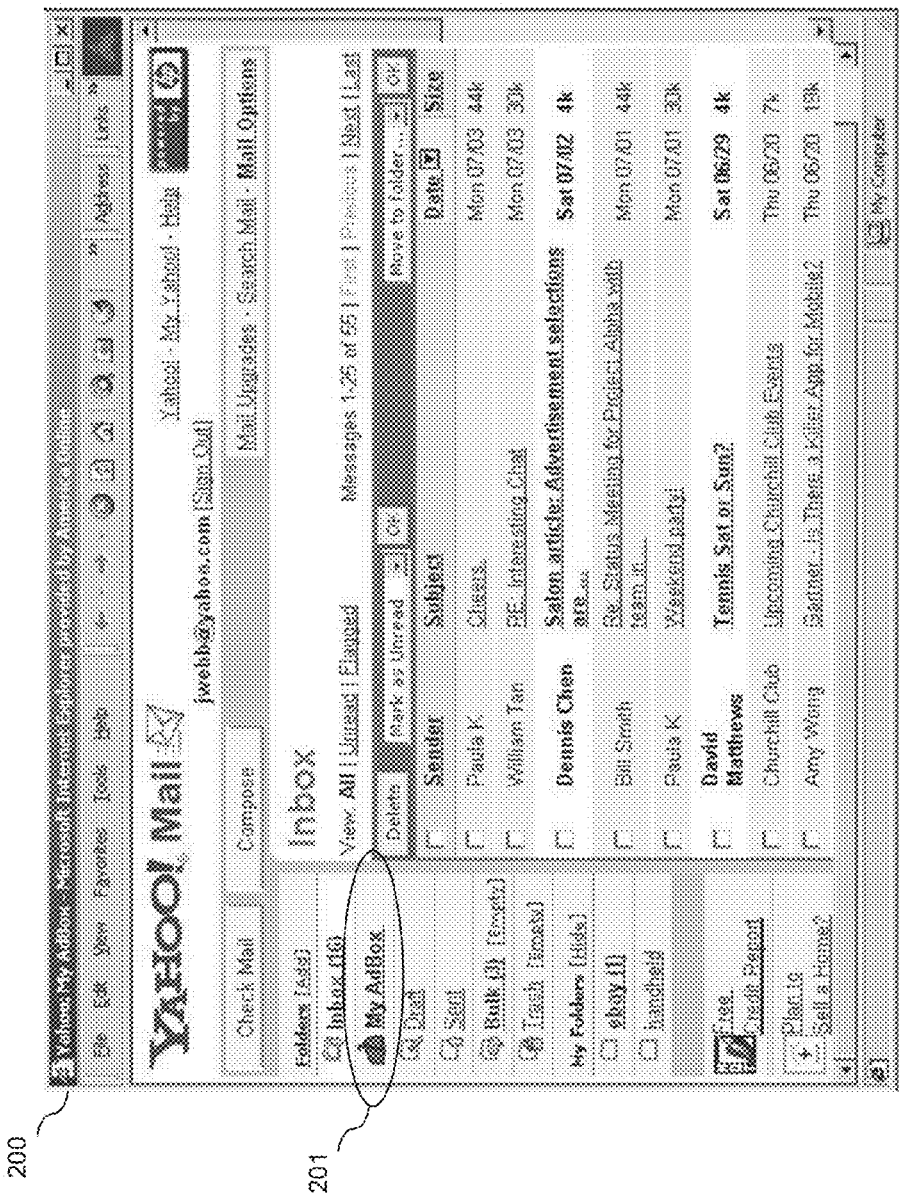
FIG. 2. illustrates a web-based email interface of an affiliate with a graphical link to the special promotions folder in one embodiment of the present invention.

As shown in FIG. 1, the user will access his web-based email account using a browser 24 through a network to the affiliate web-based email website 11. The preferred embodiment of the network runs on top of TCP/IP and HTTP. Upon accessing the web-based email provider's web site 11, the user logs on an will be presented with his email-box 200, an example of which is featured in FIG. 2. A prominent graphical link 201, is placed within the interface of the web-based email interface 200. The graphical link 201, entices the user to check for promotions, which may be of interest to the user.

Figure 3A:
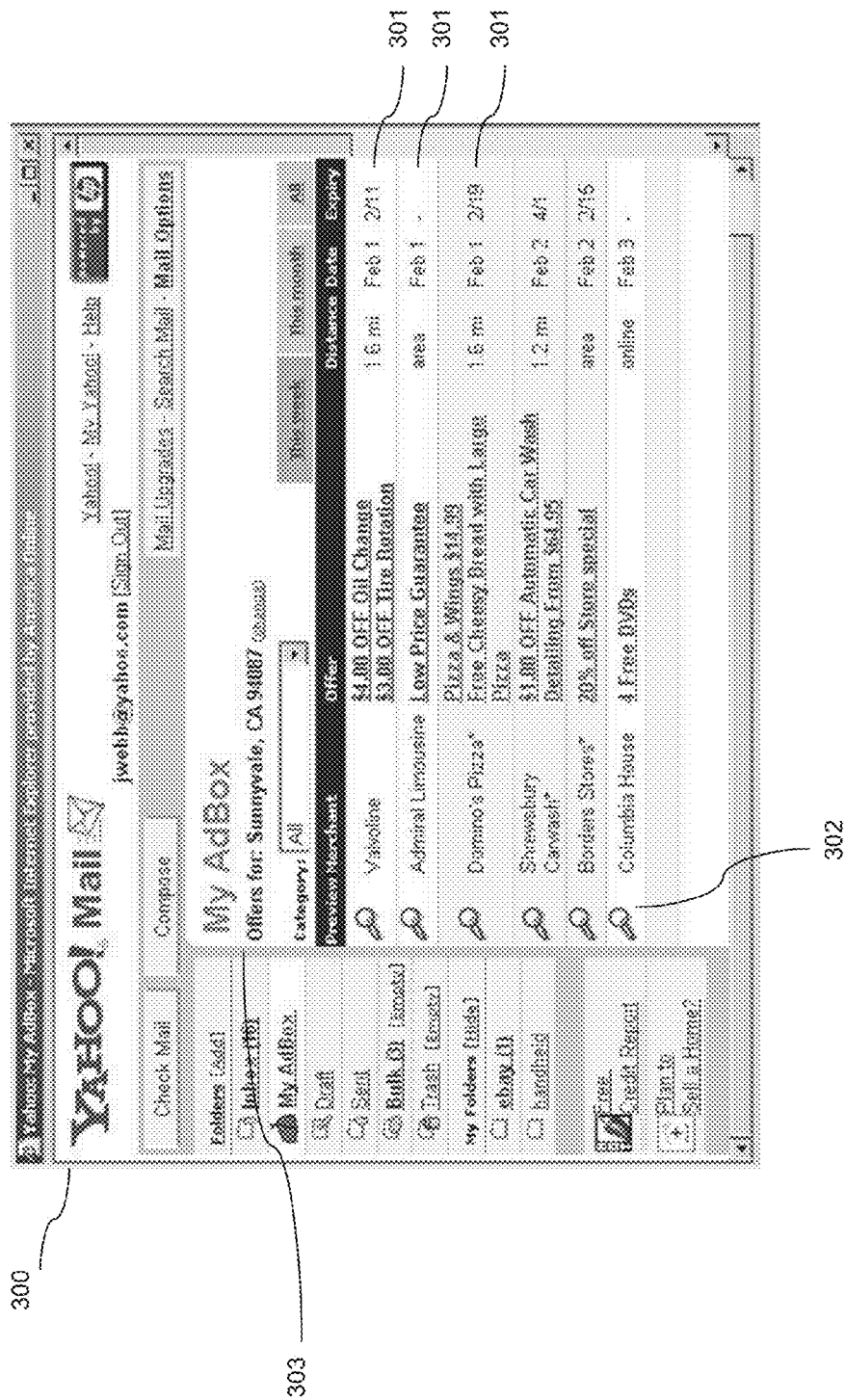
FIG. 3a. illustrates an example of a list of promotions in a special promotions folder within the interface of a web-based email provider in one embodiment of the present invention.

Upon clicking on the graphical link 201, the user will be shown the promotions folder 300 depicted in FIG. 3a. In this embodiment, depending on the affiliate's preference, two different methods can be used to display the folder. In one method in FIG. 1, the promotions folder will be served by the promotions client 12 resident on and integrated with the affiliate web-server 11, and the other method, the promotions server 20 will serve the promotions folder over a network 10. In the first method, the promotions client 12 will interact with the promotions server 20 to pull the content needed to generate the promotions folder and ensure the correct targeted promotions are shown to the user, whereas in the second method, the promotions server 20 will emulate a look and feel of the affiliate's website 11 and generate the promotions folder at the promotion server's 20 end.

Promotions Preview Process

Figure 3B:
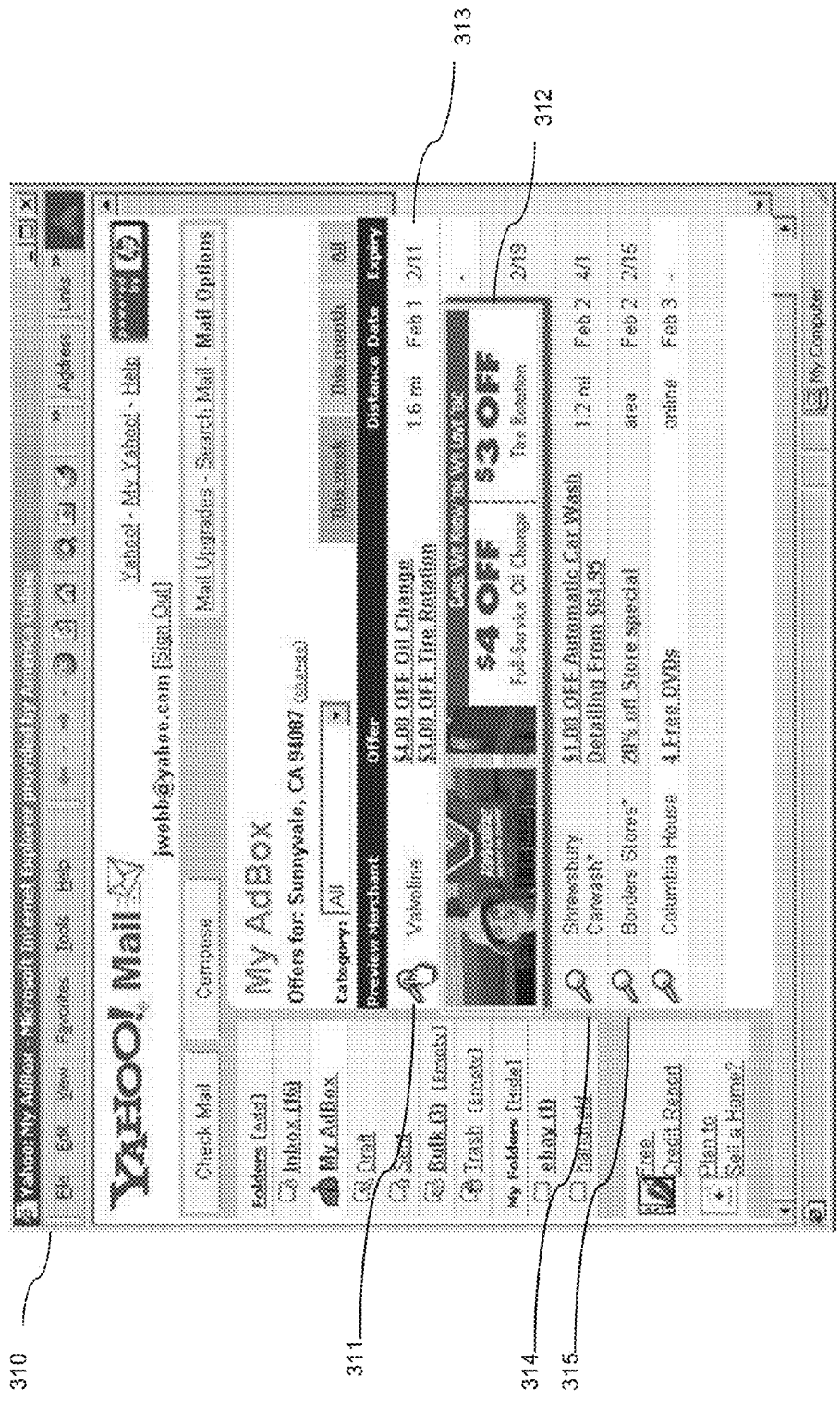
FIG. 3b. illustrates an example of a preview triggered by the hovering of the mouse on top of an icon that serves as a triggering routine in one embodiment of the present invention.

The promotions folder 300 in FIG. 3a will feature a plurality of promotions 301 listed either in date, name, category, distance or other criteria sorted order. Each line of the promotions listing 301, will feature an icon 302 that will trigger the preview for that promotion. FIG. 3b illustrates a diagram of a promotions folder 310, wherein the user has his mouse hovered over a preview triggering icon 311, where the preview for the promotion is currently visible (active) 312. The preview 312 will automatically disappear (deactivate) after a set period of time, after the user has moved his mouse away from the triggering icon 311, or when the user movies his mouse to the triggering icon 311 of another promotion. The method to perform the preview involves the JavaScript browser scripting technology and Dynamic HTML (DHTML), wherein, the preview is a DHTML layer manipulated by JavaScript. In the specific embodiment of the invention, a hidden HTML layer is created for each of the entries to place the preview content in when the user activates the triggering mechanism. This is achieved using the <DIV> </DIV> tags and setting the position style variable to "absolute" and visibility style variable to "hidden" and when the trigger is triggered, the visibility variable is set to "visible" thus showing the hidden preview content. Alternative embodiments may use only one hidden HTML layer that is shared between different previews or any other methods to achieve the overlay or sliding out effect familiar to those skilled in the art such as the use of IFRAMES and Java applets.

Specifically, in this preferred embodiment of the invention, each preview 312 is keyed to appear directly under the listing of the promotion 313, appearing like a drop-down layer sliding out from under the promotion listing. Other preview methods may include an animated graphic moving across the current browser window with accompanying audio.

Also in order to prevent accidental triggering, in a specific embodiment of the invention, delays are introduced in the preview triggering mechanism to ensure that the user has his mouse over the preview trigger a specific period of time before the preview is actually triggered and shown to the user. To allow the user some leeway, a delay is also introduced before the preview is hidden after the user has moved his mouse away from the preview trigger or preview content layer.

The total payload of all the previews in the promotions folder 310 listing may be quite huge, thus slowing down the overall loading of the promotions folder. This effect is mitigated by ensuring that the initial loading of the page does not include the loading of the "heavy" objects in the preview content, such as graphics. One method to achieve this is to initially put in lightweight content or images in place of the heavyweight graphical preview content 312, during the serving of the promotions folder (in the HTML code), then triggering the loading of the heavyweight graphical preview 312, by a JavaScript code after the promotions folder page has finished loading to the user's browser. The JavaScript code will load the heavyweight graphical previews from the promotions server, and replace the lightweight content or images with the heavyweight content before the previews 312 are shown. Another method to achieve a "fast load" of the promotions folder 310 is to activate the loading of the heavyweight content only after the user has triggered the preview loading routine 311. This method may result in the user being subjected to a delay in the loading of the preview. In this embodiment of the invention, both methods are used.

The preferred embodiment of the invention further includes the ability to load preview content using a predictive loading algorithm to determine the order in which preview content are loaded in the background. The algorithm may take into account the priority given to the promotion and the size of the preview content. In addition, the algorithm may load previews based on the real-time triggering pattern of the previews by the user, which may include the proximity of not-yet-loaded previews from previously viewed and loaded previews. An example would be when the user triggers a preview 314, any not-yet-loaded previews 315 in close proximity to the triggered preview 314 would be loaded in the background.

Another suggested enhancement to this feature is to take advantage of the Keep-Alive feature of the HTTP protocol (persistent HTTP) wherein a series of requests for content can be made on a single TCP/HTTP connection to the promotions server allowing the content to be loaded faster. Other methods to achieve dynamic loading may include using technologies such as Flash and Java or other routines familiar to those skilled in the art, wherein the preview content may be streamed to the browser giving the user an impression that the content is loading quickly.

In cases where the network is slow and there is considerable delay loading a preview after a user has activated the preview trigger, a routine is executed to delay the appearance of the preview until the preview has completely loaded. During this delay, an animation can be shown to signal to the user that the content is currently loading.

Figure 3C:
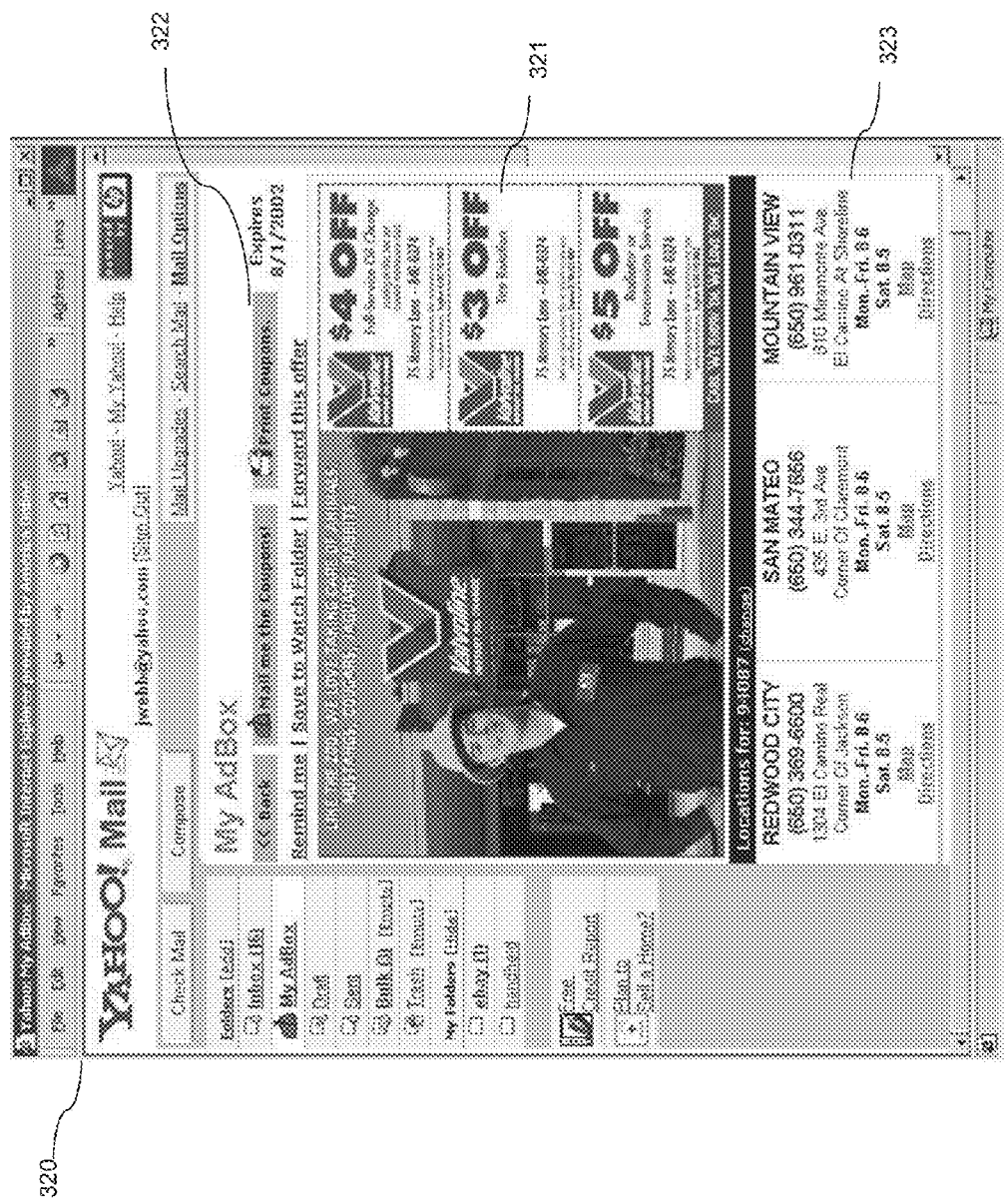
FIG. 3c. illustrates an example of content within a promotion served in one embodiment of the present invention.

FIG. 3*c* depicts an example of a body of a promotion. The promotion page 320 consists of the promotion content and associated coupons 321, options (links) for the user to print, have the coupon mailed to him, to save the coupon to be viewed later, to forward the coupon to an email address and an option to be reminded to use the coupon at a later date 322. The promotion page also consists of links to applications such as mapping directions and store locators 323. These applications can either be hosted locally at the promotions server, or be integrated over the network with an external mapping or locator service such as MapQuest.

Figure 8:
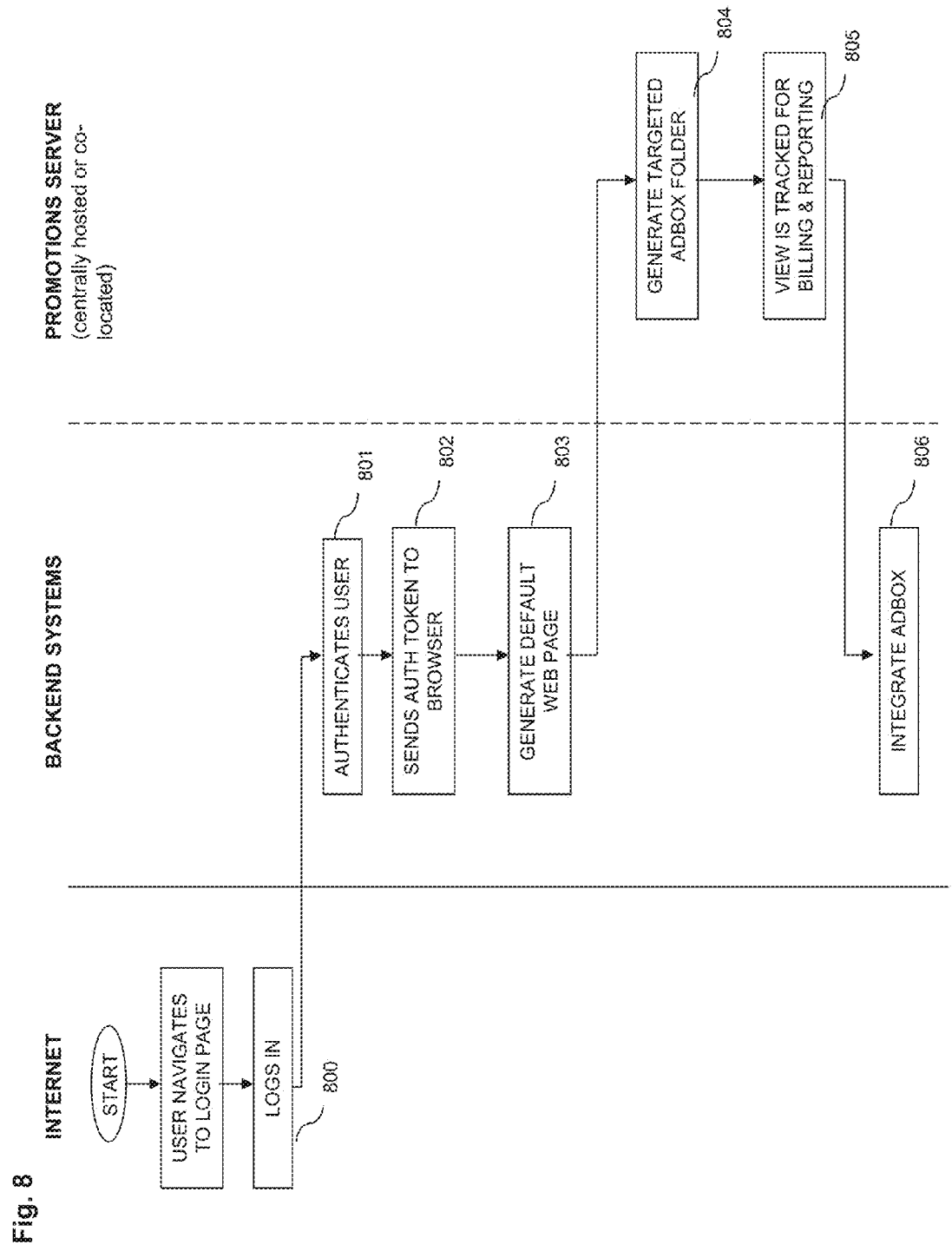
FIG. 8. depicts the sequence of processes involved in displaying a listing of promotions to users of a web-based email provider according to the preferred embodiment.

FIG. 8 traces the sequence of processes executed between the time the user logs in 800 to the web-based email system until the promotions folder (Ad Box) is displayed to the user 806. The user logs in to the web-based email system 800 wherein the web-based email server authenticates the user 801 and a token 802 is sent to the browser identifying that the user has logged in. This token may be a cookie or any other secure mechanism familiar to those skilled in the art. The web page showing that the user has logged in is displayed to the user 803. During this time, the promotions client receives data from the web-based email server, which may include demographics information or a composite or proxy ID of the user. This information is then sent across the network to promotions server to create the content of the user's promotions folder 804. The process to create the content of the user's promotions folder 804, includes using the demographics and any other information about the user's preference and historical behavior to select relevant promotions for the user. This process 804 may be performed in real-time. In cases where a proxy ID (an ID generated by the web-based email provider, not revealing any private user's information such as email) is used, a database entry may be created for each user on the promotions server to store relevant promotions for the user. In the case where the proxy ID is used, the promotions folder may simply be the process of retrieving the promotions keyed in the user's promotions table in the database. Other algorithms familiar to those skilled in the art may be used to create the promotions folder.

The promotions served are then tracked and logged 805 for billing purposes and the promotions folder page is assembled by the promotions client and displayed to the user.

Promoter Software Routine

Figure 6:
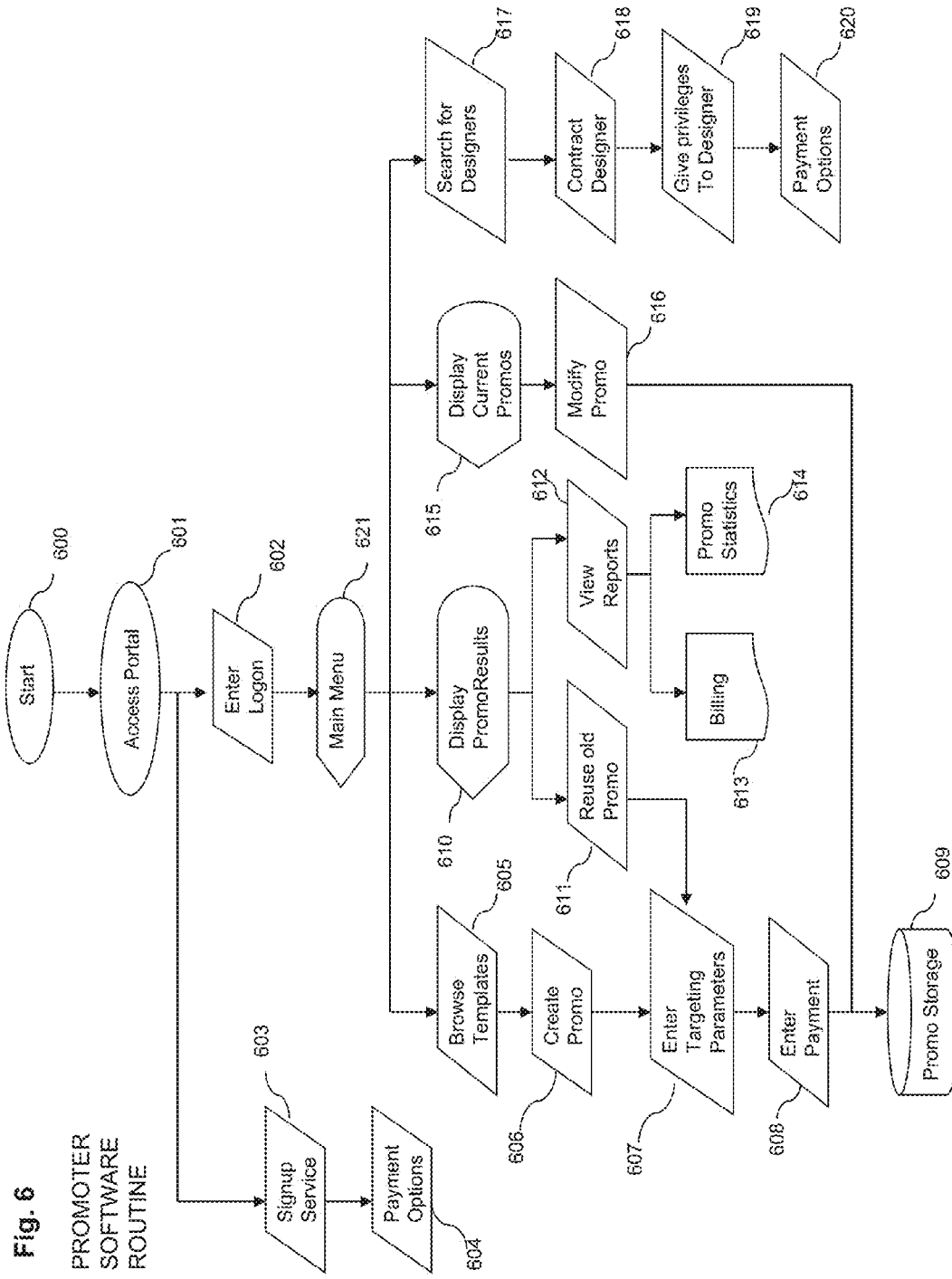
FIG. 6. is a flowchart of a software routine for a promotion issuer according to the preferred embodiment.

FIG. 6 displays the software routine for the promoter. It starts 600 with a display of the web-site portal of the promotions server. At the website, the promoter may choose to sign up 603 and create an account with the service provider wherein the promoter will enter his payment options 604 such as credit card, invoice billing, or through an online service such as PayPal.

From the main page of the portal, a registered promoter may log-in to the site 602 by authenticating himself, either by using a user ID and password or by other authentication mechanisms familiar with those skilled in the art.

After the promoter has been authenticated, the promoter will be shown the main menu 621, where he will be able to create new promotions. To create a new promotion, the promoter will use the system to browse templates of promotions 605, these templates are visual and content promotion templates wherein, the structure of the promotions are fixed and the user needs only to populate certain areas within the template to develop a complete promotion. After selecting the template, the promoter then proceeds to enter details about the promotion 606, such as the coupons, offers, graphical elements, expiry date, promotional codes and text. The promoter is then prompted to enter targeting parameters for the promotion 607. Targeting parameters may include demographics information such as zip, age, and country, behavioral and user preferences information, preferred web-based email provider network, and the amount of promotions to deliver. The amount of promotions may include the number of impressions (times) the promotion is shown, the number of users or web-based email accounts the promotions are delivered to, or the number and types of profiles used in targeting the recipients of the promotion.

Finally, the promoter will be presented with the cost of the promotion 608, upon which the promoter may select different payment options, such as credit card, invoice, or through an online payment service 608. When the user has completed the transaction, the promotion and billing information will be stored in storage 609.

From the main menu 621, the promoter may also display results of current or past promotions 610. From the list of promotion results 610, the promoter may choose to reuse an old promotion to create a new promotion 611. The promoter may also view detailed reports 612 including billing 613 and statistics information of past promotions 614, which may reveal such information as what kinds of recipients read or opened the promotion and which zip constituted the most response.

The system also allows promoters to conduct splits, the practice of sending different ads to different recipients of the same population. For example two different ads may be sent to 20,000 recipients living in the same zip code, split 50/50 among the population—10,000 recipients receiving one version of the ad and the other 10,000 receiving the other version. This method allows the promoter to gauge the effectiveness of the ad by looking at the results each version of the ad garnered. The promoter will be able to enter these parameters in the promotion-targeting page 607 and view the results in the promotion statistics page 614.

From the main menu 621, the promoter may display current running promotions 615 and make modifications to them 616.

From the main menu, 621, the promoter may search for promotion designers 617, create a contract with the designer 618, give privileges to the designer to access certain portions of their accounts in the site to create promotions 619, and pay the designer 620.

DETAILED DESCRIPTION OF THE SECOND PREFERRED EMBODIMENT

The second preferred embodiment of the invention is similar to the first preferred embodiment, except that in FIG. 1, the Promotions (Promo) Server 20, Account Management Server 19 and Storage 22, are hosted and managed at the web-based email (WebMail) provider's web-site 11 location and managed by the web-based email provider. The system may also be deployed in other registration based websites such as Portals and content based sites.

Conclusion

In the foregoing specification, the invention has been described with reference to specific exemplary embodiments thereof. Other embodiments will be apparent to those of ordinary skill in the art.

For example, the preview mechanism may be integrated into non-web based email email providers. It may be integrated into a proprietary email interface such as AOL or it may be integrated into Outlook as an ActiveX plugin.

The preview mechanism may also be integrated into email applications designed for mobile devices such as cellular phones and PDAs.

The invention claimed is:

1. A system for displaying promotions in an email client interface comprising:
    an email service connected to said email client interface, wherein said email service comprises a processor and a non-volatile computer memory storing computer readable instructions for effecting the connection between the email service and email client interface;
    a user account storage, comprising a non-volatile computer memory, for storing user account information collected from a user of said email service;
    a promotion server for storing promotion information, including at least one targeting parameter, wherein said promotion server comprises a processor and a non-volatile computer memory storing computer readable instructions for effecting interactions with the stored promotion information, wherein said targeting parameter includes at least physical location information associated with said user account,
    wherein said stored promotion information comprises at least three parts, including at least one promoter textual part, at least one offer textual part and at least one body part,
    wherein said stored promotion information is not an email received by said email service for display in said email client interface;
    an email view configured to effect display of at least one promotion teaser in proximate with a list of emails associated with said user account, said promotion teaser comprising at least said at least one promoter textual part and said at least one offer textual part,
    wherein said at least one promotion teaser is configured to be displayed within said email view based on, at least in part, a matching between said at least one targeting parameter and said user account information;
    wherein when an action is taken on said promotion teaser, said email client interface displays a promotion view displaying the at least one body part of said stored promotion information.

2. The system of claim 1 wherein said at least one promotion teaser is displayed in a promotion section of the email view of said email client interface.

3. The system of claim 1 wherein said email service effects the rotation of said at least one promotion teaser in said email client interface.

4. The system of claim 1 further configured with an interface within the email client interface which allows the user to customize criteria related to types of promotion information the user wants to receive which in turn assists with the determination of the promotion information that is displayed in the at least one promotion teaser.

5. The system of claim 1 wherein said at least one targeting parameter is based, at least in part, on terms in said user account information.

6. The system of claim 1 wherein said promotion view displays the body part of said promotion without displaying said list of emails.

7. The system of claim 6 wherein said email client interface is further configured with a user control allowing for at least a portion of said promotion information to be saved by the user to be viewed later.

8. The system of claim 1 wherein said at least one promotion teaser is integrated into said list of emails.

9. The system of claim 1 wherein said email client interface is further configured with a user control allowing for at least a portion of said promotion information to be converted to an email and sent to an email address using said email client interface.

10. The system of claim 1 wherein said at least one promotion teaser contains at least one of a promoter name or offer.

11. The system of claim 10 wherein said promoter name or offer is displayed as text-only within said email view.

12. The system of claim 1 wherein said at least one promotion teaser is displayed in a format substantially similar to said list of emails.

13. The system of claim 1 wherein said at least one promotion teaser appears outside said list of emails but proximate to said list of emails.

14. The system of claim 13 wherein said at least one promotion teaser are displayed above said list of one or more emails.

15. The system of claim 1 wherein a user actionable control is displayed with said promotion information wherein, when said control is actioned by a user, a window appears proximate to said promotion information showing additional visual content.

16. The system of claim 1 wherein said at least one targeting parameter corresponds to a search history of said user.

17. A method of displaying promotions that are not emails in an email client interface comprising the steps of:
    receiving, at a promotion server, promotion information, comprising at least one promoter textual part, at least one offer textual part and at least one part corresponding to a promotion;
    receiving, at said promotion server, at least one targeting parameter corresponding to said promotion information;
    retrieving, from a user account storage, user account information corresponding to a user of the email interface;

matching said at least one targeting parameter to information within said user account, wherein said targeting parameter includes at least physical location information associated with said user account;

displaying in an email view of said email client interface, with a list of one or more emails, at least one promotion teaser based at least in part on said matching, said promotion teaser comprising at least said at least one promoter textual part and said at least one offer textual part;

displaying a promotion view displaying the at least one body part of said promotion information within said email view of said email client interface, in a separate view of said email client interface from said list of one or more emails, in response to an action being taken on said promotion teaser, wherein the user is able to view said promotion view without being directed to another website.

18. The method of claim 17 wherein said separate view displays the body part of said promotion without displaying said list of one or more emails.

19. The method of claim 17 wherein said at least one promotion teaser is displayed in a format substantially similar to said one or more emails.

20. The method of claim 17 wherein said at least one promotion teaser is displayed above said list of one or more emails.

21. The method of claim 17 further comprising the step of displaying a user actionable control with said promotion wherein, when said control is actioned by a user, a window appears proximate to said promotion showing additional visual content.

22. The system of claim 1, wherein said promotion comprises at least a name of a promoter or from, offer or subject, and a body, wherein said name of promoter or from and offer or subject are displayed in the email view.

23. The system of claim 1, wherein said at least one promotion teaser approximates the appearance of said email view by comprising a graphical element for the at least one promotion teaser, wherein said graphical element comprises a name and subject line.

24. The system of claim 23, wherein said body part further comprises a rectangular box shape which encompasses the name and subject line.

* * * * *